Figure 15:
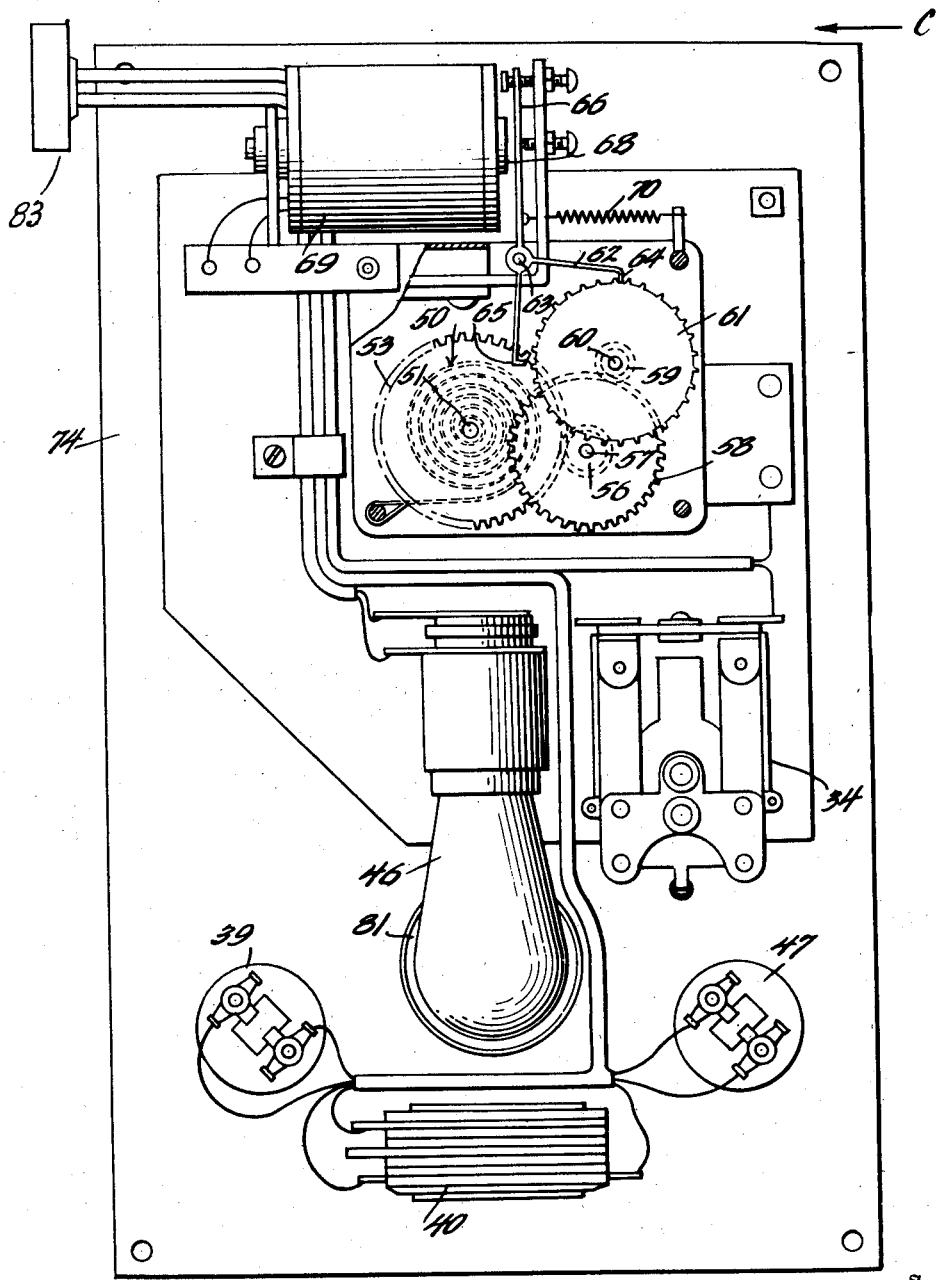

Oct. 1, 1946.  C. S. OST  2,408,576
APPARATUS FOR INTEGRATING RADIANT ENERGY
Filed July 14, 1945     7 Sheets-Sheet 1
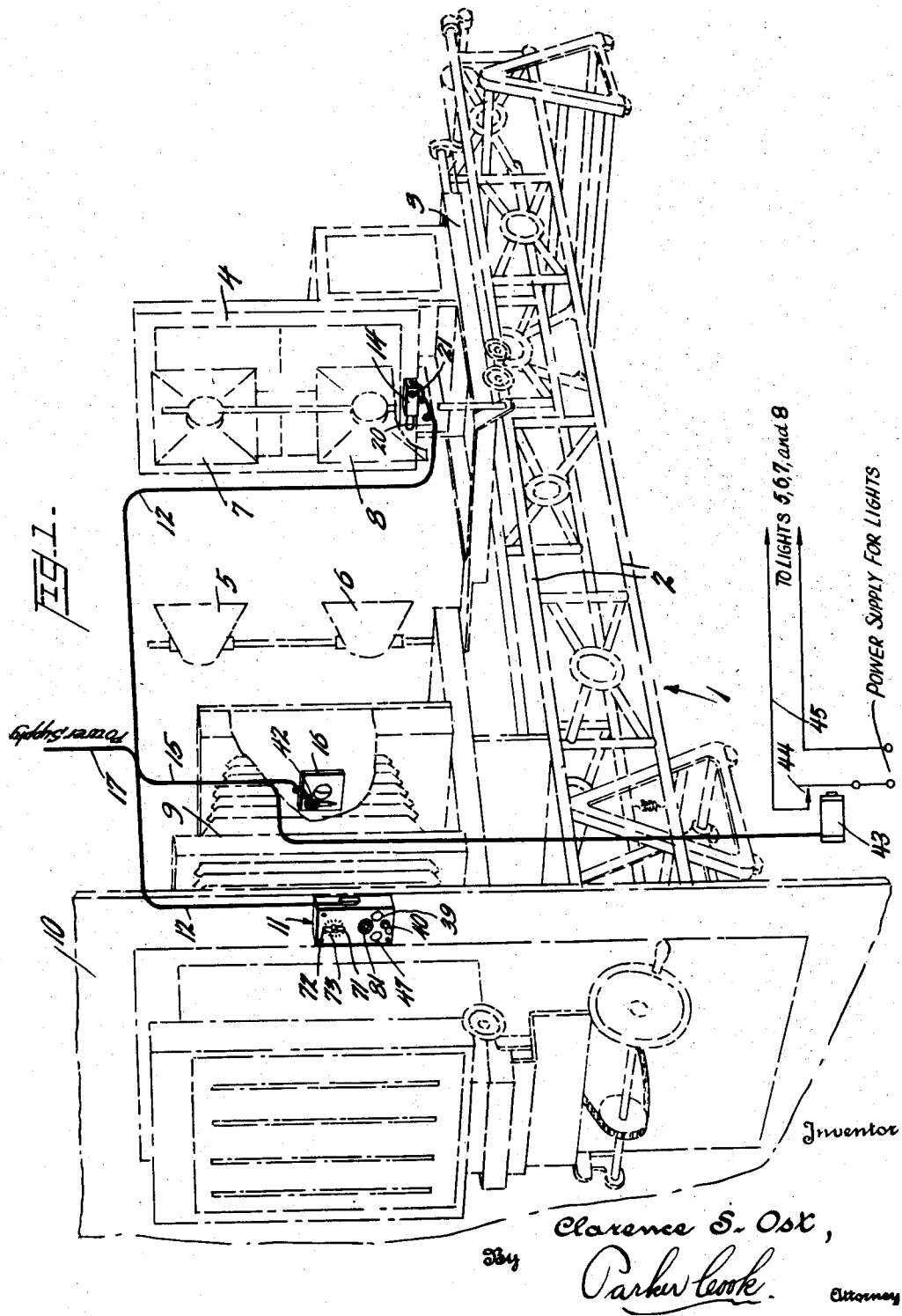
Inventor
Clarence S. Ost,
By
Parker Cook.
Attorney Oct. 1, 1946.　　　　　C. S. OST　　　　　2,408,576
APPARATUS FOR INTEGRATING RADIANT ENERGY
Filed July 14, 1945　　　7 Sheets-Sheet 2
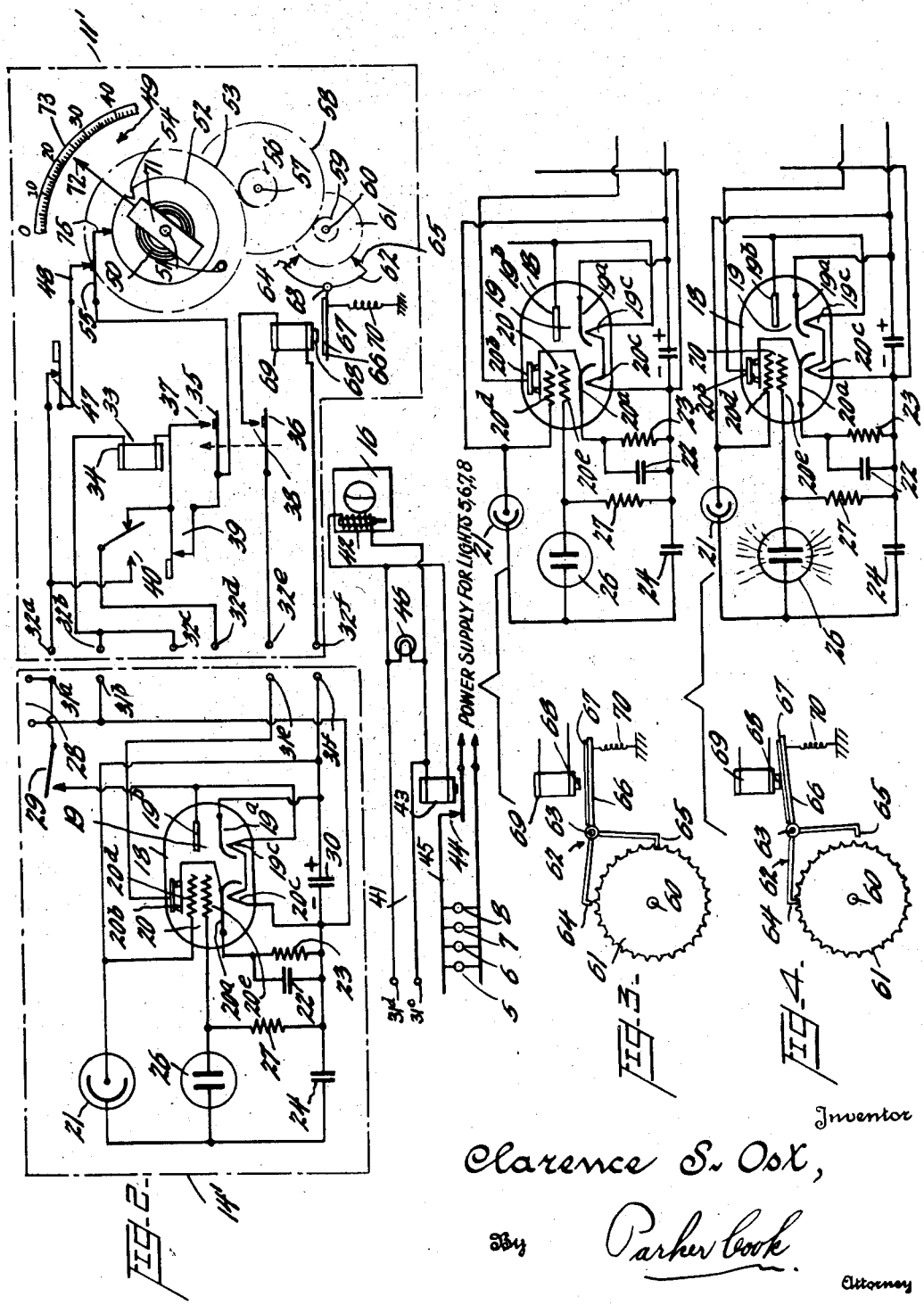
Inventor
Clarence S. Ost,
By Parker Cook
Attorney

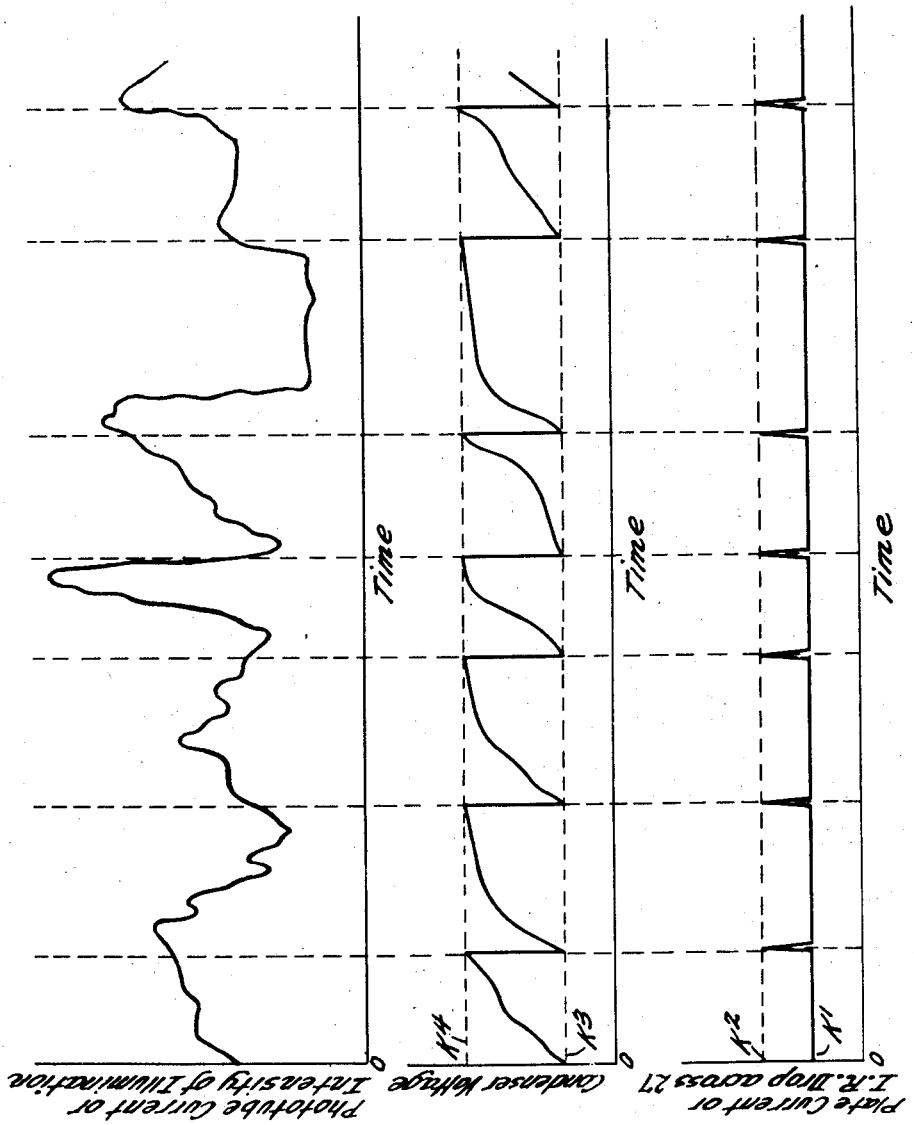

Oct. 1, 1946.     C. S. OST     2,408,576
APPARATUS FOR INTEGRATING RADIANT ENERGY
Filed July 14, 1945     7 Sheets-Sheet 4
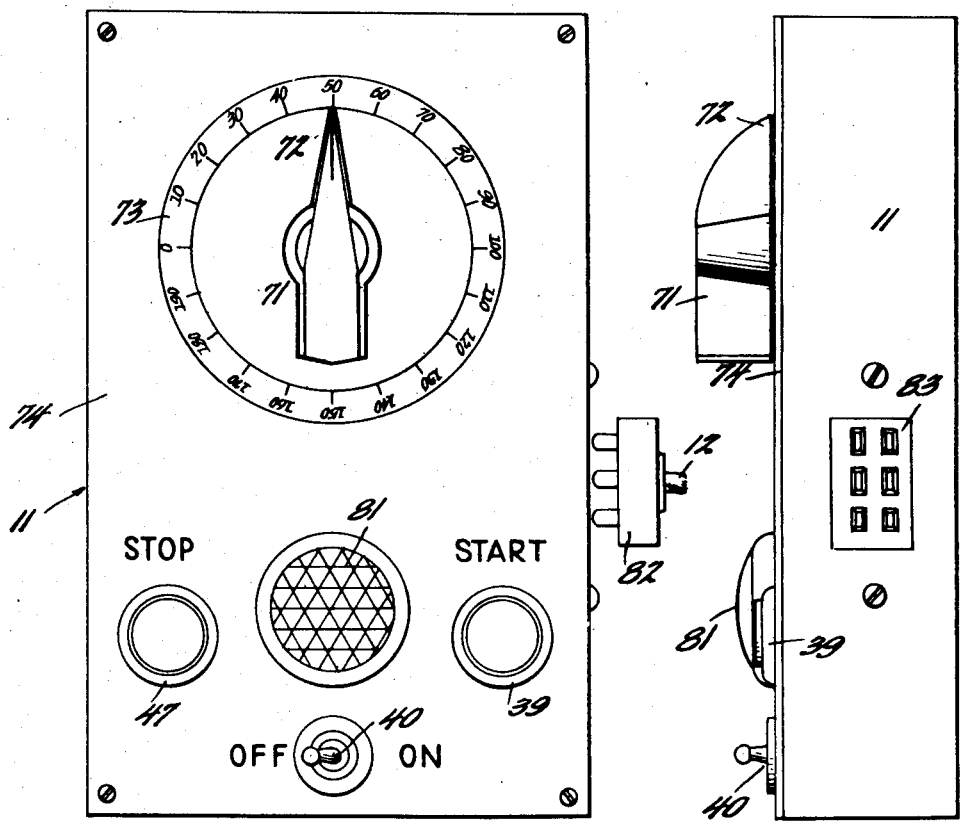
Inventor
Clarence S. Ost,
By Parker Cook.
Attorney

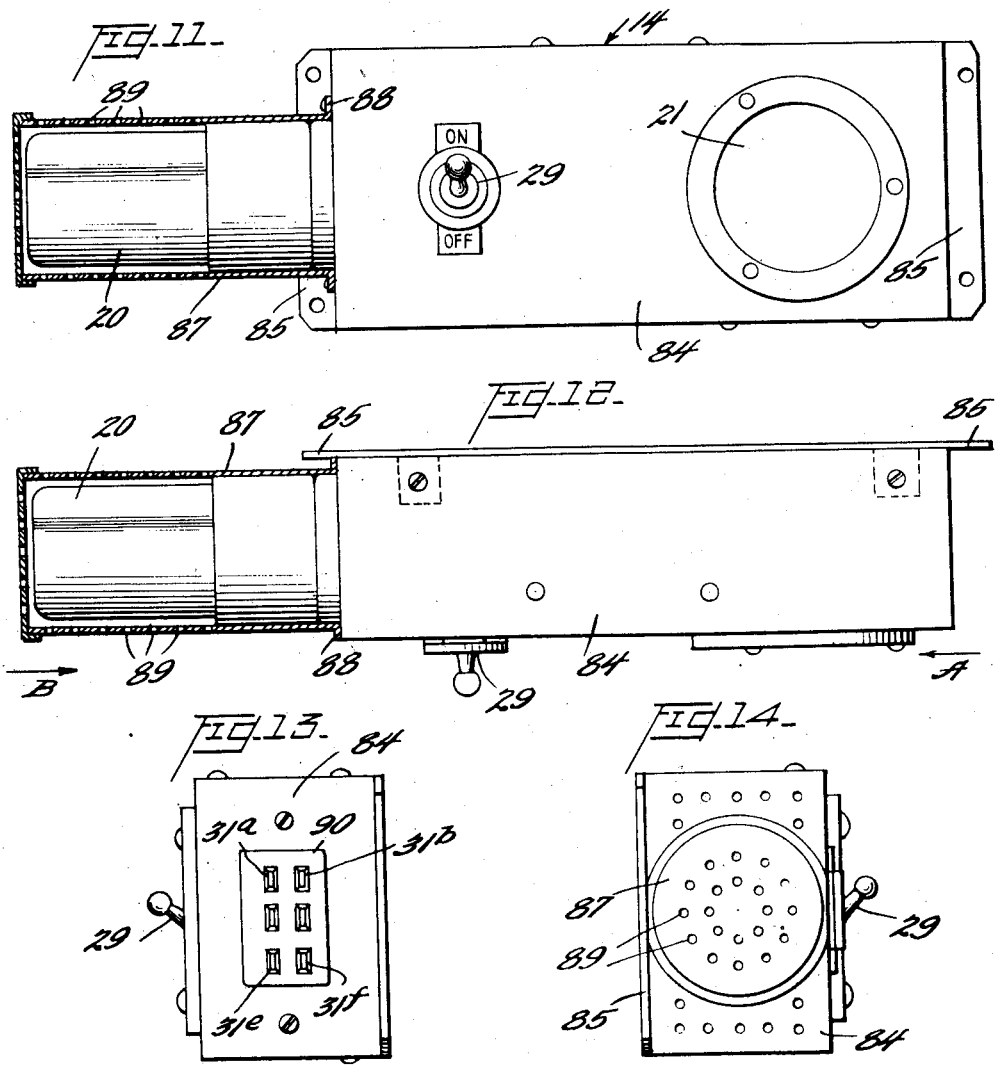

Oct. 1, 1946.  C. S. OST  2,408,576
APPARATUS FOR INTEGRATING RADIANT ENERGY
Filed July 14, 1945  7 Sheets-Sheet 6

Inventor
Clarence S. Ost,
By Parker Cook
Attorney

Oct. 1, 1946.  C. S. OST  2,408,576
APPARATUS FOR INTEGRATING RADIANT ENERGY
Filed July 14, 1945  7 Sheets-Sheet 7
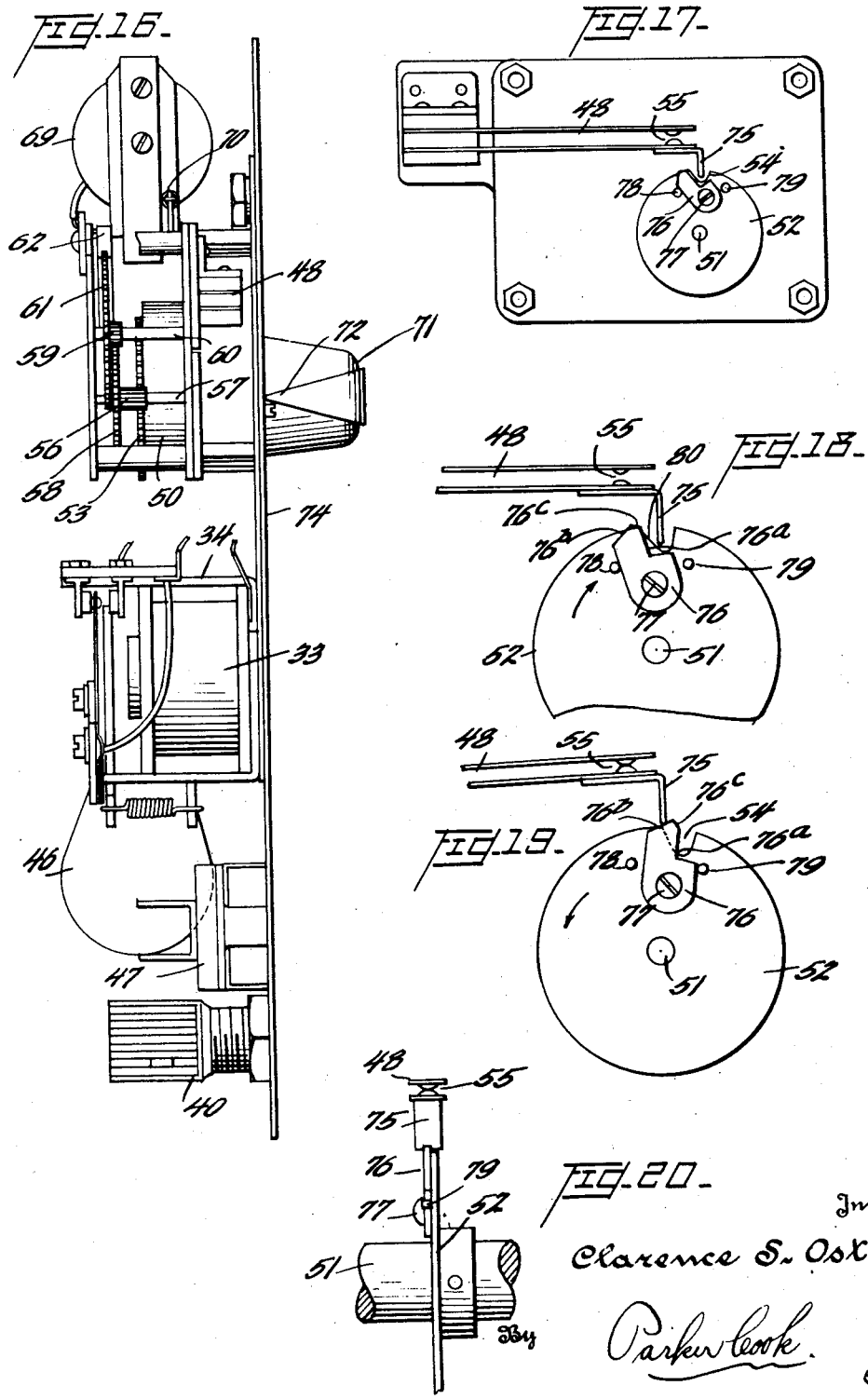

Patented Oct. 1, 1946

2,408,576

UNITED STATES PATENT OFFICE 2,408,576

APPARATUS FOR INTEGRATING RADIANT ENERGY

Clarence S. Ost, Atlantic City, N. J.

Application July 14, 1945, Serial No. 605,124

4 Claims. (Cl. 250—41.5)

My invention relates broadly to a radiant energy integrating apparatus and more particularly to a combined electronic and mechanical device for integrating intensities of radiant energy.

One of the objects of my invention is to provide an improved construction of mechanical and electronic system for measuring radiant energy by integrating fluctuating radiant energy intensities and automatically varying the duration of time to compensate for such fluctuating intensities.

Another object of my invention is to provide a combined mechanical and electronic control system whereby the quantity of radiant energy emitted from any given source may be integrated for controlling the operation of associated electrical circuits.

Still another object of my invention is to provide an arrangement of a coacting electronic circuit and mechanical system whereby the quantity of radiant energy emitted from a radiant source may be integrated and when an exact predetermined quantity of radiant energy has been received from the source, an electrical control circuit is actuated by the mechanical system for operating an associated electrical circuit.

Still another object of my invention is to provide a combined electronic and mechanical radiant energy control circuit and apparatus which is relatively small in physical dimensions and which may be readily utilized for measuring and controlling radiant energy sources which may fluctuate over a relatively wide range for securing from such sources that integrated quantity of light necessary to properly produce photographic exposures in various industries such as photoengraving, photolithography and the graphic arts in general; the measurement of exact amounts of irradiation of various cultures or vegetation to ultra-violet; the exposure of materials to X-rays, such as the radiography of castings and other industrial applications; the exposure in radiology and roentgenology of the human body, etc.; the measurement of gamma rays, etc.; exposure of blueprints, and photographic and graphic applications generally.

Still another object of my invention is to provide a compact device which may be installed in power areas where wide fluctuations in line voltage may occur even over a range of plus or minus 20% for integrating fluctuating light intensities for effecting exact photographic exposures in the graphic arts.

Other and further objects of my invention reside in an apparatus which combines high electronic and mechanical efficiencies of coacting electronic and mechanical instrumentalities for integrating radiant energy over a wide range of fluctuating surging or flickering values as is set forth more fully in the specification hereinafter following by reference to the accompanying drawings in which:

Figure 1 is a perspective view showing the application of the system of my invention to photographic apparatus for use in the graphic arts; Fig. 2 is an electrical circuit diagram showing the coaction of the electronic and mechanical elements of the system of my invention; Fig. 3 is a schematic and diagrammatic view illustrating the coordination of the mechanical and electrical elements of the system of my invention under conditions where the quantity of radiant energy received is not yet sufficient to effect an operation of the mechanical system; Fig. 4 is a schematic view of the mechanical and electrical system in which the quantity of radiant energy received has increased to a point at which the electronic system is operated and an increment of movement secured in the mechanical system; Fig. 5 is a graph, arbitrarily chosen, of the intensity of fluctuating light plotted against time; Fig. 6 is a graph of the instantaneous voltage plotted against time across the condenser of the condenser discharge circuit of the electronic control system; Fig. 7 is a graph representing either plate current of the electronic tube circuit or voltage drop across a portion of the input system to the electronic control circuit and illustrating the characteristics of the repeating pulses of the electronic control circuit; Fig. 8 is a front elevational view of the control unit employed in the system of my invention; Fig. 9 is a side elevational view of the control unit shown in Fig. 8; Fig. 10 is a top plan view of the control unit shown in Figs. 8 and 9; Fig. 11 is an elevational view of the radiant energy integrating unit which is exposed to the source of fluctuating radiant energy; Fig. 12 is a top plan view of the radiant energy integrating unit of Fig. 11; Fig. 13 is an end view of the radiant energy integrating unit of Figs. 11 and 12 looking in the direction of arrow A; Fig. 14 is an end view of the radiant energy integrating unit of Figs. 11 and 12 looking in the direction of arrow B; Fig. 15 is an enlarged elevational view showing the mechanical portion of the radiant energy integrating unit of Figs. 8–10; Fig. 16 is a side elevational view of the control unit of Fig. 15 looking in the direction of arrow C; Fig. 17 is a detailed view illustrating the cam mechanism which controls the contacts of the time switch in the radiant energy integrating unit of Figs. 8–10 and 15–16; Fig. 18 is an enlarged view of the cam operating mechanism of the timer of Fig. 17 in which the contacts are about to be closed by movement of the cam mechanism; Fig. 19 is a view of the cam mechanism of Fig. 18 showing the time control contactor closed and about to be snapped open by a counter-clockwise movement of the cam mechanism and Fig. 20 is a side elevational view of the contactor of Figs. 18 and 19 showing the relation of the cam mechanism thereto.

My invention is directed to a manually settable control unit which may be mounted remote from the apparatus on which it is used and in a convenient position to the operator and electrically connected to the radiant energy integrating unit that is mounted adjacent the work which is subject to the fluctuating light source. The shutter in the case of a camera and also the lamps may be operated by an electromagnetic device automatically operated from the control unit when the exact quantity of radiant energy has been supplied to the work regardless of the flickering and fluctuating of the radiant energy source. Thus arc lights which are highly desirable for their spectral qualities may be effectively utilized in graphic arts processes etc. regardless of the flicker and fluctuation thereof.

The radiant energy integrating apparatus of my invention comprises a composite electronic and mechanical device, the purpose of which is to measure exact quantities of radiant energy by integrating fluctuating radiant energy intensities and automatically varying the duration of time to compensate for these fluctuating intensities. The quantity of radiant energy may be varied continuously from zero to any amount. The device will automatically control any other device such as a magnetic shutter on a camera for controlling the amount of exposure; or a magnetic switch for turning on and off a radiant source of energy for measuring exact amounts of irradiation of various cultures or vegetation; or exposure of blueprints, photo-engraving plates or other plates used in various graphic arts processes; or exposure of materials, the human body, etc. to X-rays, gamma-rays, etc.

The dimensions of the control unit and the radiant energy integrating unit are exceedingly small. For example, the control unit measures but 6 inches x 3⅝ inches x 1½ inches, that is, slightly over 32½ cubic inches. The radiant energy integrating unit measures but 6¾ inches x 2¼ inches x 1½ inches, that is, slightly over 22 cubic inches. The radiant energy integrating device of my invention employs but two electron tubes. One of the tubes comprises a beam power amplifier with direct current on the anode which, electronically speaking, is capable of operating millions of times per second, limited only by electron-transit time, inter-electrode capacitance, etc. Mechanically, my instrument is limited in speed only by the inertia of the moving parts; principally the escapement mechanism and armature, which have purposely been maintained extremely light in weight. The practical limit of speed of my device is approximately one hundred escapements per second. The normal operating speed of my instrument is seven escapements per second. These seven escapements per second correspond to a movement of the exposure dial of one division. In other words, for the dial to move a complete cycle or 345°, fourteen hundred escapements must take place. The normal speed of seven escapements was chosen because the instrument, due to the purpose for which it was designed, must be capable of integrating a radiant energy flux of at least ten times the normal level of illumination in order to take care of surges of power, flickering, etc. As my instrument is capable of operating at speeds of one hundred per second, it can readily take care of these increases of radiant energy. In my instrument, at the normal operating speed, seven escapements must take place before the exposure dial traverses one division giving a fineness of control which can actually be set to one-seventh of a second. This can be made even finer by making the normal operating speed greater which can easily be done due to the high top speed inherent in the instrument. My instrument, due to its novel design, will operate satisfactorily at 115 volts plus or minus 20% and retain its calibration regardless of whether the line voltage varies slowly or rapidly. This is an important point in an instrument of this type because the instrument is used to integrate fluctuating light intensities which are caused principally by line voltage changes. So far as I am aware, no comparable device has ever been developed which occupies so small a space and yet accomplishes such precision control.

I further increase the efficiency of the radiant energy integrating device of my invention by mounting the vacuum photo tube and the beam power amplifier tube in close proximity to each other on the integrating unit for preventing leakage of energy to the leads constituting the interconnecting circuit which would otherwise tend to introduce ripples or surges in the direct current supply to the anode of the photo tube due to the capacitance in the cable which shunts the photo tube and thus would have the effect of masking or introducing errors in the instrument's calibration.

Referring to the drawings in more detail reference character 1 designates a frame structure including a rail system 2 along which the adjustable structure 3 carrying the work support 4 and the light sources 5, 6, 7 and 8 is adapted to be adjusted in position with respect to the camera 9. The camera 9 is illustrated mounted adjacent one end of the frame structure 1 adjacent the panel 10 from which position the operator is enabled to focus the camera 9 on the work carried by the support 4. I have shown the light sources 6 in the form of arc lights which while rich in their spectral qualities are, nevertheless, inherently subject to flickers, fluctuations and a wide variation in light intensities. However, with the light integrating system of my invention such variations and intensities are not detrimental and do not impair the quality of the reproduction.

I mount the control unit as represented at 11 in a convenient position adjacent the panel 10 connected through the cable represented at 12 to the electronic light integrating unit shown at 14 mounted adjacent the work support 4 in the path of the light rays from the light source 5, 6, 7 and 8. The cable 12 also includes a branch circuit extending therefrom as represented at 15 to the electromagnetically controlled shutter device represented at 16 and to the electromagnetically operated light relay represented at 43 and 44. A further extension of the cable system represented at 17 leads to the power supply system.

The circuits in the radiant energy integrating unit 14 are represented in the outline 14' in Fig. 2. The circuits and mechanism contained within the control unit 11 are as outlined at 11' in Fig. 2. The binding posts 31a, 31b, 31e and 31f on the radiant energy integrating unit 14 connect through cables to the binding posts which have been shown in respective alignment therewith within the outline 11' at 32a, 32b, 32e and 32f. For the purpose of explaining the circuit connection it will be sufficient to assume jumper connections between the respectively aligned binding posts. Binding posts 31c and 31d of the externally controlled circuit connect through cables to binding posts 32c and 32d within control unit 11 outlined at 11'.

Referring to Fig. 2 of the drawings, reference character 18 designates a composite tube including a helf-wave rectifier 19 and a beam power amplifier 20. The half-wave rectifier 19 includes cathode 19a and anode 19b in which cathode 19a is heated by heater element 19c. The beam power amplifier tube 20 includes the cathode 20a, the anode 20b, the heater element 20c, the screen grid 20d and the control grid 20e. The photo tube 21 which receives the radiant energy from the fluctuating light sources 5, 6, 7 and 8 is connected between the cathode 20a and the positive side of the D. C. power supply through a series path which includes by-pass condenser 22 shunted by cathode bias resistor 23 connected in series with condenser 24. The control grid 20e is connected to one electrode of gaseous discharge tube 26 and also to the negative side of the D. C. power supply through the grid resistor 27. The other electrode of gaseous discharge tube 26 is connected to the positive side of condenser 24 and also to the cathode of photo tube 21. The gaseous discharge tube 26 and resistor 27 provide a path for discharge of condenser 24. The heater elements 19c and 20c are energized from the alternating current power line circuit represented at 28 through switch 29. The alternating current from the power line circuit 28 is supplied to the half-wave rectifier 19 through the connection to the anode 19b thereof as shown and the rectified voltage across the filter condenser 30 used as an anode and screen supply for the beam power amplifier tube 20 and also as an anode supply for the photo tube 21.

Cathode resistor 23 and by-pass condenser 22 supply the proper negative bias voltage for the control grid 20e of the beam power amplifier 20. A condenser 24 is charged through photo tube 21 to the ionization potential of gaseous discharge tube 26 through which it discharges via resistor 27. The anode supply voltage of photo tube 21 is greater than the ionization potential of gaseous discharge tube 26 so that it is assured that series condenser 24 will be charged up to this ionization potential.

An operating winding 33 of relay 34 serves to control through a suitable movable armature a double pole single throw contact system consisting of leaf springs 35 and 36 movable with respect to coacting contacts 37 and 38 which are normally opened when the armature of relay 34 is in the unenergized position. Reference character 39 comprises a momentary contact switch device which is normally open. Reference character 40 designates a single pole double throw switch which when thrown to the left is used for applying line voltage to terminals 32c and 32d which connect through leads 41 to any desired external system to be controlled such as the electromagnetic actuator 42 of the camera shutter 16 and the relay 43 which controls the contact system 44 leading to the power supply circuit 45 for the lamps 5, 6, 7 and 8. A pilot light 46 is connected in shunt with the electromagnetic actuator 42 and relay winding 43 for indicating the condition when power is on or off the circuit 41. The left side of the switch 40 is used to actuate the external system independently of the timing mechanism for purposes of focusing, etc. The right side of switch 40 connects the external system for automatic operation in connection with the timing mechanism.

Reference character 47 designates a momentary contact normally closed switch which is electrically connected in series with the automatically controlled switch 48 of the timing mechanism represented generally at 49. The timing mechanism 49 includes a spring wound motor device 50 which operates upon a shaft 51 to which is secured a cam plate 52 and a gear 53. The cam plate 52 is suitably notched at one peripheral portion thereof indicated at 54 to serve as an acting means for the contactors 55 constituting the switch 48.

The gear 53 drives spur gear 56 of shaft 57 which carries gear 58 meshed with gear 59 on shaft 60. Shaft 60 carries the escape wheel 61 which coacts with the double pallet lever escapement 62 pivoted at 63. The double pallet lever escapement 62 is provided with arms extending approximately normal to each other and provided with inwardly directed teeth 64 and 65 which are alternately engageable and disengageable from the peripheral teeth of the escape wheel 61. The double pallet lever escapement 62 has an extension 66 thereon which carries soft iron armature 67 which is attracted to the pole piece 68 of electromagnetic winding 69 against the tension of spring 70. The electromagnetic winding 69 is electrically connected in the plate circuit of the beam power amplifier tube 20 by the connection through the contact system 36—38 and on binding posts 32e—31e; and 32f—31f, the connection being established through anode 20b of beam power amplifier tube 20 as shown.

The shaft 51 of the spring wound motor device 50 has a manually operable grip or handle 71 thereon which terminates in a pointer 72 which is operative over the scale 73 on the front panel 74 of the control unit 11. The scale 73 is divided by suitable graduations which may extend through various divisions. The pointer 72 is permanently fixed to move with the cam plate 52 and may be revolved by grasping handle 71 and revolving shaft 51 for storing energy in spring wound motor device 50. Shaft 51 is fastened to gear 53 through a friction clutch which allows the handle device 71 to be moved manually for the purpose of setting without moving gears 53, 58 or escape wheel 61. The action of spring wound motor device 50 is to shift cam plate 52 in a counter-clockwise direction to a position in which the peripheral notch 54 moves into registration with the end of leaf spring 75 for opening the contactors 55 constituting the switch 48 after the exact quantity of radiant energy has been integrated due to the rate of operation of the double pallet lever escapement 62 which is permitted by the frequency of the impulses which excite electromagnetic winding 69 and by the movement transmitted through the train of gears from the escapement 61 through gears 59, 58, 56 and 53. The notch or recess 54 in the cam plate 52 is aligned with the zero position of the graduated scale 73 at which time contactor 55 is open and the circuit through the beam power amplifier tube 20 is de-energized so that the electronic operating system is deactivated.

The de-activated position of the contactors 55 has been shown more clearly in Fig. 18 from which it will be seen that the cam plate 52 carries an angularly shiftable plate member or dog 76 pivotally mounted at 77 adjacent the periphery of cam plate 52 and disposed centrally with respect to the peripheral notch 54. The angularly shiftable plate member 76 is formed to provide a guide surface over which the end of leaf-spring member 75 may be displaced. The periphery of the angularly shiftable plate member 76 is cut away as represented at 76a for allowing the end of leaf spring member 75 to drop quickly within the peripheral notch 54 of the cam plate 52 for opening the contactors 55 to the positions represented in Figs. 17 and 18. The cam plate 52 carries a pair of limiting stops 78 and 79 thereon which restrict the angular movement of the angularly shiftable dog 76 to the opposite limiting positions shown in Figs. 18 and 19; the position illustrated in Fig. 18 providing for the quick opening of contactors 55 and the position illustrated in Fig. 19 providing for the closing of contactors 55. The upper limiting end of the angularly shiftable plate member 76 is beveled as represented at 76b and 76c so that when the handle 71 (Fig. 16) is manually gripped for shifting the shaft 51 clockwise for winding the spring wound motor device 50 the end of leaf spring member 75 rides up upon the side face 80 of the peripheral notch 54 closing the circuit through the contactors 55.

When the cam plate 52 continues to rotate in the clockwise direction as mentioned, the leaf spring member 75, after riding up on the side face 80 of the peripheral notch 54, contacts the beveled surface 76c of the dog 76 and it forces the dog 76 back against the stop 78 and on the continued rotation of the plate, the leaf spring member drops down until it contacts with the periphery of the cam plate 52 thus holding the contactors 55 in their closed position.

When the cam plate 52 rotates in a counter clockwise direction under control of the escapement mechanism, the leaf spring member 75 will contact with the beveled surface 76b of the dog 76 and forces the dog to the right until the same contacts with the stop 79. The end of the leaf spring member will then continue to ride up the surface 76b until it reaches the apex and on the continued rotation of the cam plate 52, after the leaf spring member passes the apex, it will contact with the beveled surface 76c of the dog forcing the dog out of the way, permitting the leaf spring member 75 to move quickly into the notch 54 and thus quickly break the contact between the contactors 55.

By providing an arrangement of this kind, all the advantages of a quick electrical break are obtained.

In Fig. 16 I represent in side elevation the elements of the radiant energy integrating device corresponding to the plan view of Fig. 15 and the circuit diagram of Fig. 2. It will be seen that the relay 34 is mounted adjacent the timing mechanism and in compact association with the pilot lamp 46 and the momentary normally closed contact switch 47 and the focusing switch 40. The momentary normally opened contact switch 39 is also arranged in compact relation to the elements as hereinbefore described. A bull's eye lens 81 is mounted on panel 74 immediately above lamp 46 for readily indicating from the outside of the control box the active or inactive condition of the circuits.

Electrical connection is established between the control unit 11, the light integrating unit 14 and the electromagnetically controlled shutter device 16 and electromagnetically operated light relay 43 through the cable 12 terminating in plug 82, the springs of which fit into and engage the socket 83 in the wall of the control unit.

The light integrating unit 14 is illustrated more clearly in Figs. 11–14 from which it will be seen that the beam power amplifier tube 20 is directly mounted in one end of the casing represented at 84 to provide short length leads to the photo tube 21. The casing 84 includes the circuits of the unit 14 represented within the limits of the dotted line 14' in Fig. 2. Casing 84 is provided with flanged extensions 85 at opposite ends thereof to facilitate mounting of the structure on a suitable supporting surface. The beam power amplifier tube 20, when plugged into the socket in one end of the casing 84 is mechanically protected and electrically shieldable by means of tubular casing 87. The tubular casing 87 is flanged at 88 to provide means for securing the casing 87 to the casing 84 and includes perforations 89 distributed over the sides and end thereof to provide adequate ventilation for the beam power amplifier tube 20. The electrical circuits illustrated in Fig. 2 are brought out to terminals in the receptacle 90 in the end of casing 84 prepared for connection to a coacting plug connected to a cable extending from cable 12 shown in Fig. 1 and having connecting members $32a$, $32b$, $32e$ and $32f$ thereon adapted to establish connection respectively with the contacts $31a$, $31b$, $31e$ and $31f$ in receptacle 90.

Fig. 5 is a curve diagram showing the intensity of light plotted against time in the usual fluctuating light source with which the light integrating system of my invention is required to operate. The curve shows the photo tube current or the intensity of light as ordinates plotted against time and inasmuch as the photo tube current is directly proportional to the intensity of light the curves are superimposed as they are identical in shape.

Fig. 6 is a curve diagram showing the instantaneous voltage across condenser 24. The ordinate $K_3$ is a constant determined by the potential across condenser 24 at which gaseous discharge tube 26 de-ionizes. The peak of the curve in Fig. 6 is also a constant at $K_4$, the magnitude of which is determined by the ionization potential of gaseous discharge tube 26.

Fig. 7 is a curve diagram representing either the plate current of beam power amplifier tube 20 or the I. R. drop across resistor 27. In the case where the curve represents plate current the ordinate $K_1$ is a constant which shows the steady anode current and ordinate $K_2$ is a constant representing the peak anode current of each discharge pulse. In the case where the curve represents the I. R. drop across resistor 27, the constant $K_1$ becomes zero and the constant $K_2$ represents the peak I. R. drop across resistor 27 determined by the ionization potential of gaseous discharge tube 26.

The space or time intervals between the discharge pulses which constitute the curve of Fig. 3 integrate the irregular curve of Fig. 1. This can be seen by comparing the areas under the sections of the curve divided by the discharge pulses. They should all be equal showing the products of time and light intensity between each pulse as being equal.

In the operation of the system of my invention terminals 28 are connected to the power supply and the line switch 29 is closed. A few minutes are allowed for the heaters 20c and 19c of beam power amplifier 20 and half wave rectifier 19 to stabilize. Single pole double throw switch 40 is thrown to the right. Pointer 72 is set on scale 73 to the desired quantity which automatically closes switch 48. Momentary contact switch 39 is pressed which energizes relay 34 and closes contacts 37—35 and 38—36. Relay 34 remains energized through its now closed magnetically held contacts 37—35. Closed contacts 38—36 complete anode circuit of beam power amplifier tube 20 with electromagnetic windings 69 as its load.

Photo tube 21 within housing 84, supplied with or without filters, receives a portion of the fluctuating radiant energy to which the subject or material is being exposed. Photo tube 21 feeds a charge to the condenser 24 the magnitude, at any instant, being in direct proportion to the intensity of radiant energy, at any instant, which is received by photo tube 21. Voltage across condenser 24 builds up until it reaches the ionization potential of gaseous discharge tube 26 at which time gaseous discharge tube 26 ionizes and discharges condenser 24 through resistor 27. The I. R. drop across resistor 27, the upper part being positive, is applied in series with the bias voltage between cathode 20a and control grid 20e of beam power amplifier tube 20. Plate current flows in beam power amplifier tube 20 through electromagnetic winding 69 pulling armature 67 and allowing one tooth of escape wheel 61 to escape. Fig. 3 indicates the condition of escape wheel 61 while condenser 24 is storing up a charge received from photo tube 21. Fig. 4 shows the movement imparted to escape wheel 61 as condenser 24 discharges through gaseous discharge tube 26 thereby producing an I. R. drop across resistor 27 and decreasing the bias on control grid 20e and increasing the current flow through winding 69. However, the spring 70 immediately restores the double pallet lever 62 to the position shown in Fig. 3. This sequence continues until pointer 72 returns to zero when switch 48 opens, removing line voltage from winding 33 which opens contacts 37—35 and 36—36 and also removing line voltage from terminals 32c and 32d which contact through terminals 31c and 31d to the controlling devices such as electromagnetically controlled shutter 16 and electromagnetic control 43 to the lamps, 5, 6, 7 and 8. Contacts 38—36 remove anode current from winding 69, stopping escapement mechanism from operating.

The condenser 24 and resistor 27 are selected of such capacity and resistance that the time of discharge of condenser 24 is sufficient to swing the control grid in beam power amplifier 20 less negative and hold it less negative for a sufficient time to overcome the inertia of the armature 67 and thus allow step by step movement of the double pallet lever 62 under control of electromagnet 68. The time of discharge of condenser 24 is such as to effect the movement of the armature for controlling the escapement 61 tooth by tooth. The capacity of condenser 24 is not so small that photo tube 21 would lend to continuously charge the condenser 24 at the same rate or greater rate than it is discharging through gaseous discharge tube 26.

The left side of switch 40 is also used in addition to its "off" function for applying line voltage to terminals 32c and 32d for controlling the external devices without operating the escapement wheel 61 or relay 34.

The charge fed by photo tube 21 to condenser 24 is dependent upon the intensity of radiant energy striking its cathode surface and this charge is essentially linear, depending entirely upon photo cathode emission and is practically independent of anode potential.

The beam power amplifier tube 20 is capable of operating millions of times per second, limited only by electron-transit time, inter-electrode capacitance, etc. Mechanically, my instrument is limited in speed only by the inertia of the moving parts; mainly, the escapement mechanism and armature 66, which have been purposely kept in weight. The practical limit of speed of my device is approximately one hundred escapements per second. The exposure dial 73 on my instrument is graduated from 0 to 200 in approximately 345°. The normal operating speed of my instrument is seven escapements per second. These seven escapements per second correspond to a movement of the exposure dial of one division. In other words, for the dial to move a complete cycle or 345°, fourteen hundred escapements must take place. The normal speed of seven escapements was chosen because the instrument, due to the purpose for which it was designed, must be capable of integrating a light flux of at least ten times the normal level of illumination in order to take care of surges of power, flickering, etc. As my instrument is capable of operating at speeds of one hundred per second, it can easily take care of these increases of light. In my instrument, at the normal operating speed, seven escapements must take place before the exposure dial traverses one division giving a fineness of control which can actually be set to one-seventh of a second. This can be made even finer by making the normal operating speed greater which can easily be done due to the high top speed inherent in the instrument.

The fact that the photo tube 21 in the device of my invention is immediately adjacent the beam power amplifier tube 20 and not connected through a high resistance element, or long cable remote from the grid of the beam power amplifier tube 20 reduces opportunity or danger of leakage, stray voltages, etc. Also, due to the shortness of the connection between photo tube 21 and beam power amplifier tube 20, any ripple or surges in the D. C. supply to the anode of the photo tube 21 due to the capacitance in the cable which shunts the photo tube cannot have the effect of masking or introducing errors in the instrument's calibration.

My instrument, due to its novel design, will operate satisfactorily at 115 volts plus or minus 20% and retain its calibration regardless of whether the line voltage varies slowly or rapidly. This is important in an instrument of this type because the instrument is normally used to integrate widely varying or fluctuating light intensities which are caused principally by line voltage changes.

While I have described my invention in one of its preferred embodiments, I realize that changes in details may be made and I desire that it be understood that no limitations upon my invention are intended other than those which may be imposed by the scope of the appended claims.

What I claim and desire to secure by Letters Patent of the United States is as follows:

1. In a radiant energy integrating system for automatically predetermining exposures by a source of spectral rays of variable light intensities; a control circuit; an electronic circuit including a light responsive device subjected to the variable light intensities; a power amplifier tube, including a cathode, a control grid, and an anode; an anode circuit connected between said anode and cathode and including electro-magnetic means therein; a source of D. C. potential connected in circuit with said electro-magnetic means, one side of said light responsive device being connected to said source of D. C. potential; a cold cathode gaseous discharge tube of the two element type connected from its one side to the other side of said light responsive device, and the other side of said gaseous discharge tube connected to said control grid; a condenser and resistor connected in series and disposed in shunt to said gaseous discharge tube; biasing means disposed between said cathode and the junction point between said resistor and said condenser, whereby the charge delivered by said light responsive device charges said condenser at a rate dependent upon the intensity of light to which said light responsive device is subjected, for affecting a discharge through said gaseous discharge tube and applying a change of potential to said control grid, for controlling current flow in said anode circuit, thereby energizing the electro-magnetic means therein at a rate dependent upon the intensity of light to which said light responsive device is subjected; an electric switch disposed in said control circuit, a selectively settable actuator for operating said electric switch; an escapement mechanism for controlling the movement of said actuator; said electro-magnetic means controlling the movement of said escapement mechanism at a rate proportional to the rate of operation of said electronic circuit for affecting the operation of said electric switch when a predetermined quantity of light has been incident upon said light responsive device.

2. In a radiant energy integrating system for automatically predetermining exposures by a source of spectral rays of variable light intensities; a control circuit; an electronic circuit including a light responsive device subjected to the variable light intensities; a power amplifier tube including a cathode, a control grid, a screen grid, and an anode; an anode circuit connected between said anode and cathode and including electro-magnetic means therein; a source of D. C. potential connected in circuit with said electro-magnetic means, one side of said light responsive device being connected to said source of D. C. potential; a cold cathode gaseous discharge tube of the two element type connected from its one side to the other side of said light responsive device, and the other side of said gaseous discharge tube connected to said control grid; a condenser and resistor connected in series and disposed in shunt to said gaseous discharge tube; a cathode bias resistor and bypass condenser connected in shunt and disposed between said cathode and the junction point between said first mentioned resistor and said first mentioned condenser, whereby the charge delivered by said light responsive device charges said first mentioned condenser at a rate dependent upon the intensity of light to which said light responsive device is subjected for affecting a discharge through said gaseous discharge tube and applying a change of potential to said control grid for controlling current flow in said anode circuit, thereby energizing the electro-magnetic means therein at a rate dependent upon the intensity of light to which said light responsive device is subjected; an electric switch disposed in said control circuit; a selectively settable actuator for operating said electric switch; a double pallet lever escapement mechanism for controlling the movement of said actuator; said electro-magnetic means controlling the movement of said double pallet lever escapement mechanism at a rate proportional to the rate of operation of said electronic circuit for affecting the operation of said electric switch when a predetermined quantity of light has been incident upon said light responsive device.

3. In a radiant energy integrating system for automatically predetermining exposures by a source of spectral rays of variable light intensities; a control circuit; an electronic circuit including a light responsive device subjected to the variable light intensities; a power amplifier tube in close proximity thereto and including a cathode, a control grid and an anode; an anode circuit connected between said anode and cathode and including electro-magnetic means therein; a source of D. C. potential connected in circuit with said electro-magnetic means, one side of said light responsive device being connected to said source of D. C. potential; a cold cathode gaseous discharge tube of the two element type connected from its one side to the other side of said light responsive device, and the other side of said gaseous discharge tube connected to said control grid; a condenser and resistor connected in series and disposed in shunt to said gaseous discharge tube; biasing means disposed between said cathode and the junction point between said resistor and said condenser, whereby the charge delivered by said light responsive device charges said condenser at a rate dependent upon the intensity of light to which said light responsive device is subjected, for affecting a discharge through said gaseous discharge tube and applying a change of potential to said control grid, for controlling current flow in said anode circuit, thereby energizing the electro-magnetic means therein at a rate dependent upon the intensity of light to which said light responsive device is subjected; an electric switch connected in said control circuit, a selectively settable actuator for operating said electric switch; an escapement mechanism for controlling the movement of said actuator, the speed of the escapement mechanism being unlimited electronically, due to the vacuum type power amplifier tube, and limited mechanically in speed only by the inertia of the moving parts; said electro-magnetic means controlling the movement of said escapement mechanism at a rate proportional to the rate of operation of said electronic circuit for affecting the operation of said electric switch when a predetermined quantity of light has been incident upon said light responsive device.

4. In a radiant energy integrating system for automatically predetermining exposures by a source of spectral rays of variable light intensities; a control circuit; an electronic circuit including a light responsive device subjected to the variable light intensities; a power amplifier tube in close proximity thereto and including a cathode, a control grid and an anode; an anode circuit connected between said anode and cathode and including electro-magnetic means therein; a source of D. C. potential connected in circuit with said electro-magnetic means, one side of said light responsive device being connected to said source of D. C. potential; a cold cathode gaseous discharge tube of the two element type connected from its one side to the other side of said light responsive device, and the other side of said gaseous discharge tube connected to said control grid; a condenser and resistor connected in series and disposed in shunt to said gaseous discharge tube; biasing means disposed between said cathode and the junction point between said resistor and said condenser, whereby the charge delivered by said light responsive device charges said condenser at a rate dependent upon the intensity of light to which said light responsive device is subjected, for affecting a discharge through said gaseous discharge tube and applying a change of potential to said control grid, for controlling current flow in said anode circuit, thereby energizing the electro-magnetic means therein at a rate dependent upon the intensity of light to which said light responsive device is subjected; an electric switch connected in said control circuit, a selectively settable actuator for operating said electric switch; an escapement mechanism for controlling the movement of said actuator, the normal speed of the escapement mechanism being seven times a second and capable of operating at one hundred times per second; said electro-magnetic means controlling the movement of said escapement mechanism at a rate proportional to the rate of operation of said electronic circuit for affecting the operation of said electric switch when a predetermined quantity of light has been incident upon said light responsive device.

CLARENCE S. OST.